(12) United States Patent
Lamb et al.

(10) Patent No.: US 11,829,811 B2
(45) Date of Patent: Nov. 28, 2023

(54) SYSTEMS AND METHODS FOR EXCHANGING ELECTRONIC DATA

(71) Applicants: International Business Machines Corporation, Armonk, NY (US); Youredi Ltd., Espoo (FI)

(72) Inventors: Marshall Allen Lamb, Raleigh, NC (US); Liviu Rodean, Hilliard, OH (US); Sami Petteri Tähtinen, Vantaa (FI); Mats Bernhard von Weissenberg, Kauniainen (FI)

(73) Assignees: INTERNATIONAL BUSINESS MACHINES CORPORATION, New York, NY (US); YOUREDI LTD., Espoo (FI)

( * ) Notice: Subject to any disclaimer, the term of this patent is extended or adjusted under 35 U.S.C. 154(b) by 280 days.

(21) Appl. No.: 17/478,326

(22) Filed: Sep. 17, 2021

(65) Prior Publication Data

US 2023/0089128 A1    Mar. 23, 2023

(51) Int. Cl.
*H04L 29/06*    (2006.01)
*G06F 9/54*    (2006.01)
(Continued)

(52) U.S. Cl.
CPC ............. *G06F 9/547* (2013.01); *G06F 16/24* (2019.01); *H04L 63/0823* (2013.01);
(Continued)

(58) Field of Classification Search
CPC ....... G06F 9/547; G06F 16/24; G06Q 20/027; G06Q 20/388; G06Q 30/04; H04L 63/0823; H04L 63/0869
See application file for complete search history.

(56) References Cited

U.S. PATENT DOCUMENTS

| 7,873,726 B2 | 1/2011 | Ofir et al. |
| 11,683,744 B2 * | 6/2023 | Tiwari ................ H04W 76/19 726/3 |

(Continued)

FOREIGN PATENT DOCUMENTS

| GB | 2370734 A | 7/2002 |
| KR | 20020003835 A | 1/2002 |

(Continued)

OTHER PUBLICATIONS

Mauro Sardara et al., A Transport Layer and Socket API for (h)ICN: Design, Implementation and Performance Analysis, Sep. 21, 2018, ACM, pp. 137-147. (Year: 2018).*

(Continued)

*Primary Examiner* — Jeffrey C Pwu
*Assistant Examiner* — Fahimeh Mohammadi
(74) *Attorney, Agent, or Firm* — Troutman Pepper Hamilton Sanders LLP

(57) ABSTRACT

A computer program product configured to execute a method for exchanging electronic data. The method includes receiving, using an API, a request to transmit data from a source trading partner to a destination trading partner; querying a name server, using a domain name system protocol, the name server comprising a subdomain of the destination trading partner to send the data to, wherein the subdomain is mapped to a destination access point, wherein a name of the subdomain conforms to a common format, wherein an address of the subdomain conforms to another common format; determining the address of the subdomain based on the querying of the name server; addressing the data, using another API, to be sent to the address of the subdomain; and transmitting the data, using the another API, to the destination access point by virtue of the subdomain's mapping to the destination access point.

16 Claims, 11 Drawing Sheets

(51) Int. Cl.
  *G06F 16/24* (2019.01)
  *H04L 9/40* (2022.01)
  *G06Q 30/04* (2012.01)
  *G06Q 20/02* (2012.01)
  *G06Q 20/38* (2012.01)

(52) U.S. Cl.
  CPC ....... *H04L 63/0869* (2013.01); *G06Q 20/027* (2013.01); *G06Q 20/388* (2013.01); *G06Q 30/04* (2013.01)

(56) References Cited

U.S. PATENT DOCUMENTS

| | | | |
|---|---|---|---|
| 2004/0148333 A1* | 7/2004 | Manion | H04L 63/104 709/201 |
| 2009/0103461 A1* | 4/2009 | Tan | H04L 67/568 370/310 |
| 2012/0030593 A1 | 5/2012 | Arunachalam | |
| 2012/0323986 A1* | 12/2012 | Sayko | H04L 47/10 709/201 |
| 2016/0205106 A1* | 7/2016 | Yacoub | H04W 12/041 726/28 |
| 2019/0057379 A1* | 2/2019 | Chalakudi | H04L 63/12 |
| 2020/0195608 A1* | 6/2020 | Wisgo | H04L 63/0218 |
| 2020/0250013 A1* | 8/2020 | Boran | H04L 65/1033 |
| 2021/0044623 A1* | 2/2021 | Bosch | H04L 63/1433 |
| 2022/0182435 A1* | 6/2022 | Sodagar | H04L 65/80 |
| 2022/0311668 A1* | 9/2022 | Shah | H04L 41/0883 |
| 2023/0050360 A1* | 2/2023 | Sodagar | H04L 65/612 |
| 2023/0055957 A1* | 2/2023 | Sodagar | H04L 65/1016 |

FOREIGN PATENT DOCUMENTS

| | | |
|---|---|---|
| KR | 20060033829 A | 4/2006 |
| KR | 20080081878 A | 9/2008 |
| KR | 20090111887 A | 10/2009 |
| KR | 100996147 A | 11/2010 |

OTHER PUBLICATIONS

Basileal Imana et al.,Institutional Privacy Risksin Sharing DNS Data, Jul. 24, 2021, ACM, pp. 69-75. (Year: 2021).*
W. Colitti, K. Steenhaut et al., REST Enabled Wireless Sensor Networks for Seamless Integration with Web Applications, Nov. 14, 2011, IEEE, pp. 867-872. (Year: 2011).*
Syed Taha Ali et al., A Survey of Securing Networks Using Software Defined Networking, Sep. 2015, IEEE, vol. 64, Issue: 3, pp. 1086-1097. (Year: 2015).*
OpenPeppol. (n.d.). Retrieved from the Internet: URL: https://peppol.eu/ [retrieved on Jan. 2, 2019].

* cited by examiner

SYSTEMS AND METHODS FOR EXCHANGING ELECTRONIC DATA

TECHNICAL FIELD

The present invention relates to electronic data exchange and, more particularly, to systems and methods of exchanging electronic data between trading partners.

BACKGROUND

Value-Added Networks ("VANs") have been around for many decades and have formed the backbone of electronic commerce for nearly one million businesses world-wide. Every day, all day, these networks exchange documents between enterprises doing business with each other—orders, shipments, invoices, payments, typically using the Electronic Digital Interchange (EDI) data standard. The greatest function the VAN network provides is that of a routing fabric, able to link two enterprises in electronic data exchange no matter where they are in the world or what VAN provider they subscribe to, much like telephone companies and postal services do. A vast amount of the world's gross domestic product relies on the integrity of this network of VANs.

However, much of the interconnected VAN networks are still relying on decades-old file transfer-based technology and batch-oriented processing. Many of the transactional enterprise resource planning (ERP) systems that are typically interconnected across the VANs got their start relying on older network protocols and batch-oriented processing as a result. However, that is changing, and rapidly. Direct-to-consumer online buying habits coupled with such socio-economic pressures as global pandemics have put a tremendous focus on faster turnaround times for online purchases and deliveries, coupled with up-to-the-minute status on the same. Daily large batch-oriented order and payment processing has been forced to give way to more frequent, just-in-time smaller orders. File transfer protocols and intermediary file servers are rapidly being replaced with the simplicity of directly connected transactional systems using application programming interfaces (APIs).

VANs got their start as simple managed file transfer systems that would interconnect using MODEM dialup technology. Decades later, with the establishment of the Internet as a more reliable, faster medium for data interchange, the VANs still exist and are still largely managed file transfer systems, albeit using more modern protocols and mechanisms for managing data transformations to and from EDI as more and more modern systems are involved in the network that are not EDI based.

Even with this modernization of network infrastructure and protocols, the over 100 interconnected VAN networks of the world still rely on static knowledge of each other and what companies they serve. VAN network providers must maintain perpetual direct connectivity to each other. They also must maintain their own database of companies, their assigned EDI IDs, and what VANs on which they reside to know how to route business documents to them. This makes it difficult, labor intensive, and time consuming for a company to change VAN providers, or for new VAN providers to join the network, as all the other networks have to be told to update, or learn upon failure to deliver data than an update is needed.

VAN networks need an upgrade. They are still, and will be for the foreseeable future, vital for sustaining the gross domestic products of most developed countries in the world. However, how the networks interoperate needs to be modernized. It must be simpler to join or leave a network, add additional services to the network, or emerge as a network provider.

An ideal solution to the above shortcomings should leverage modern internet protocols more organically to evolve the VAN networks into more dynamic, resilient and flexible networks.

An ideal solution also has simplicity at its heart. It doesn't try to introduce new data or networking standards but instead relies on technologies and specifications widely used in the industry today. It also keeps the number of personas and technology "players" to a minimum, leveraging largely existing roles in the industry.

The number one reason why most systems fail or fail to be adopted is due to complexity. Besides adding costs to build and adopt, complex systems require specialized skill to maintain, which can be difficult and costly to obtain. Complexity also increases time to recover (TTR) in the event of a disruption, as it can be more difficult to triage an issue in complex systems.

The core principle of simplicity drives the natural progression of comprehension, valuation, adoption, and promotion.

Further, an ideal solution will leverage already existing, open and widely adopted technologies and specifications as a way to facilitate the modernization of the VAN network.

In addition, an ideal solution would have a decentralized and democratized ownership of the membership directory using standard Internet discovery protocols.

The dynamic aspects of the systems and methods described herein also promote network expansion, service discovery and delivery, and capitalization of existing business data formats. The systems and methods described herein promote VAN network evolution, not revolution.

If VAN network providers do not embrace the API economies and more dynamic, modern network constructs so far demonstrated by niche industry-specific players popping up all the time, then the VANs will become obsolete and will be replaced by a disconnected set of networks struggling with the problems VANs already solved.

SUMMARY

Embodiments of the present invention address and overcome one or more of the above shortcomings and drawbacks, by providing systems and methods related to modernizing value-added networks.

According to some embodiments, a computer program product in a data processing system includes a processor and a memory with instructions that are executable by the processor to cause the processor to execute a method for exchanging electronic data in a system. The method may include receiving, using a first API, a request to transmit data from a source trading partner to a destination trading partner; querying a name server, using a domain name system protocol; determining the address of the subdomain based on the querying of the name server; addressing the data, using a second API, to be sent to the address of the subdomain; and transmitting the data, using the second API, to the destination access point. The name server may include a subdomain of the destination trading partner to which to send the data. The name of the subdomain may conform to a first common format. The address of the subdomain may conform to a second common format. The subdomain may be mapped to a destination access point. The data may be transmitted to the destination access point by virtue of the subdomain's mapping to the destination access point.

Various enhancements, refinements, and other modifications can be made to the aforementioned computer program product in different embodiments. For example, in some embodiments, the first API and the second API are representational state transfer (REST) APIs using hypertext transfer protocol (HTTP). In some embodiments, the method further includes utilizing HTTP headers to include metadata related to transmission of the data. In some embodiments, the method further includes mutually authenticating the source trading partner and destination trading partner using client and server certificates. In some embodiments, wherein the destination trading partner comprises an electronic data interchange (EDI) address, the method further comprises mapping the EDI address to the second common format. In some embodiments, the method further includes storing the address of the subdomain in a local database and refreshing the address of the subdomain from the local database after an expiration period. In some embodiments, the method further includes querying, using a third API, the destination access point, determining, based on the query of the destination access point, one or more connectivity options the destination access point supports for the destination trading partner, and connecting to the destination access point according to the one or more connectivity options. In some embodiments, the first common format is https://REFERENCE-n.DOMAIN_NAME, wherein REFERENCE is an alphanumeric string that is common for all subdomain names in the system, n is a positive integer, DOMAIN_NAME is an alphanumeric string associated with the destination trading partner and is different for each trading partner in the system. In some embodiments, the subdomain is qualified by services supported by the destination trading partner and operations supported by the destination trading partner.

According to another embodiment, a system for exchanging electronic data between trading partners includes a plurality of nodes configured to exchange the data with each other using application programming interfaces (APIs). The plurality of nodes may include a source trading partner having data and configured to transmit the data, a source access point configured to exchange the data with the plurality of nodes and on behalf of the source trading partner, a destination trading partner having a subdomain, wherein an address of the subdomain conforms to a common format, and a destination access point configured to exchange the data with the plurality of nodes and on behalf of the destination trading partner. The destination trading partner may be configured to receive the data via the subdomain. The subdomain may be mapped to the destination access point such that the data sent to the subdomain is sent instead to the destination access point.

Various enhancements, refinements, and other modifications can be made to the aforementioned system for exchanging electronic data between trading partners in different embodiments. For example, in some embodiments, the system is configured to support synchronous exchanging of electronic data.

According to some embodiments, a system for exchanging electronic data comprises a processor and a memory comprising instructions that are executable by the processor to cause the processor to execute a method for exchanging electronic data in a system. The method may include receiving, using a first API, a request to transmit data from a source trading partner to a destination trading partner; querying a name server, using a domain name server protocol; determining the address of the subdomain based on the querying of the name server; addressing the data, using a second API, to be sent to the address of the subdomain; and transmitting the data, using the second API, to the destination access point. The name server may comprise a subdomain of the destination trading partner to which to send the data. The subdomain may be mapped to a destination access point. A name of the subdomain may conform to a first common format, and an address of the subdomain may conform to a second common format. The data may be transmitted to the destination access point by virtue of the subdomain's mapping to the destination access point.

Various enhancements, refinements, and other modifications can be made to the aforementioned system for exchanging electronic data in different embodiments. For example, in some embodiments, the first API and the second API are representational state transfer (REST) APIs using hypertext transfer protocol (HTTP). In some embodiments, the method further comprises utilizing HTTP headers to include metadata related to transmission of the data. In some embodiments, the method further comprises mutually authenticating the source trading partner and destination trading partner using client and server certificates. In some embodiments, wherein the destination trading partner comprises an electronic data interchange (EDI) address, the method further comprises mapping the EDI address to the second common format. In some embodiments, the method further comprises storing the address of the subdomain in a local database and refreshing the address of the subdomain from the local database after an expiration period. In some embodiments, the method further comprises querying, using a third API, the destination access point, determining, based on the query of the destination access point, one or more connectivity options the destination access point supports for the destination trading partner, and connecting to the destination access point according to the one or more connectivity options. In some embodiments, the first common format is https://REFERENCE-n.DOMAIN_NAME, wherein REFERENCE is an alphanumeric string that is common for all subdomain names in the system, wherein n is a positive integer, wherein DOMAIN_NAME is a domain name associated with the destination trading partner and is different for each trading partner in the system. In some embodiments, the address of the subdomain is qualified by services supported by the destination trading partner and operations supported by the destination trading partner.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Figure 1:
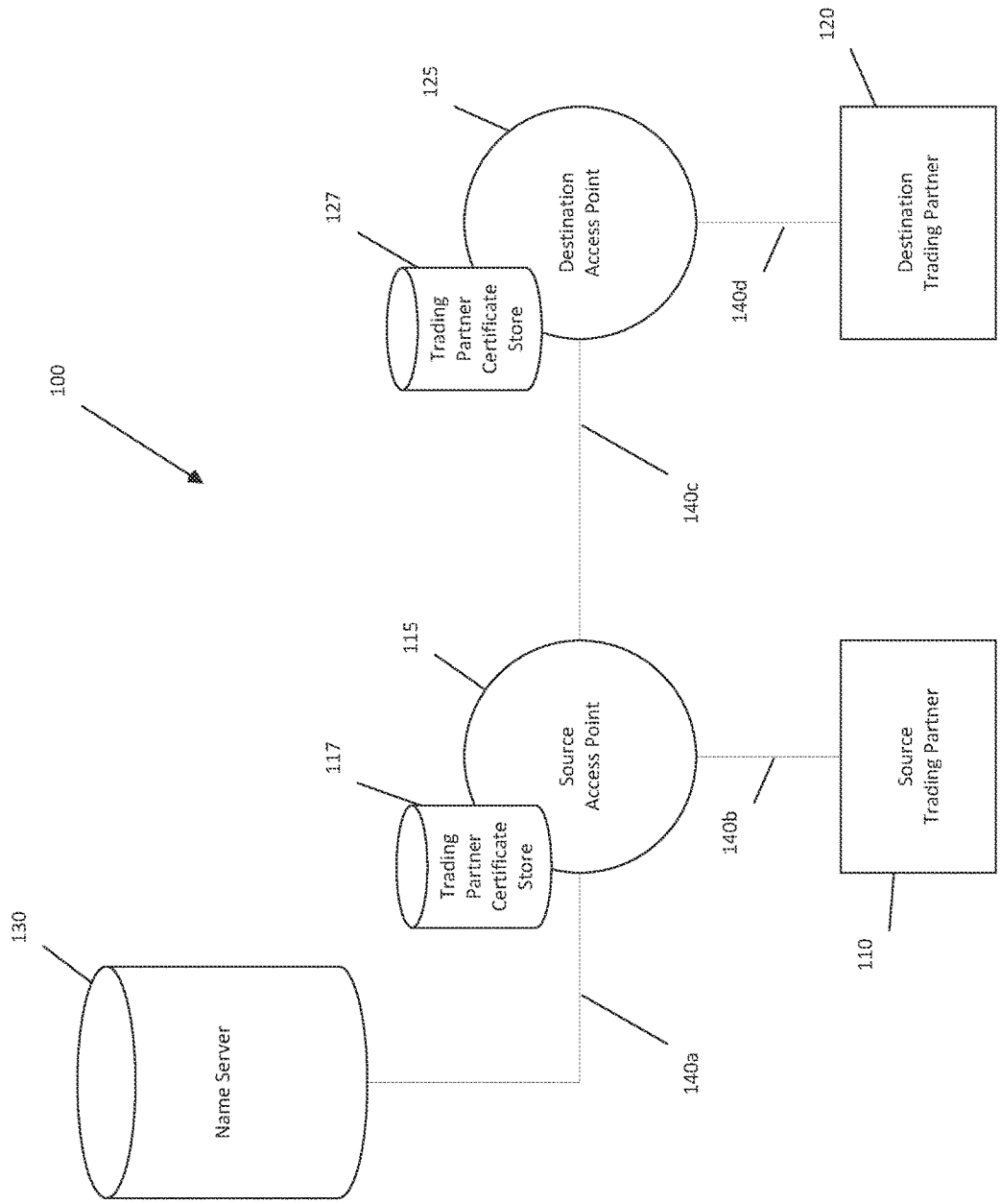
FIG. 1 is an embodiment of a system for exchanging electronic data between trading partners.

Embodiments of the present invention may be a system, a method, or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The disclosed embodiments provide systems and methods to exchange electronic data between trading partners leveraging RESTful APIs with mutual authentication to communicate between each other and the standard Domain Name System (DNS) protocol to discover each other and learn what operations are possible between them.

Overview

The present disclosure describes systems and methods for VAN network providers to interconnect and exchange messages in a more flexible and dynamic way than VANs have traditionally supported. The system has nodes that leverage APIs to communicate with each other and a name server having the domain names of each node in the system. In one embodiment, the system's nodes include two trading partners that wish to exchange messages, two access points that operate on behalf of the trading partners (access points are the primary function of a VAN provider), and a DNS. The standard DNS protocol is used for discovery of nodes. The nodes leverage RESTful APIs with mutual authentication for metadata exchange.

There are several components involved in this invention. At least one novel aspect is how the components are leveraged to build the system and define the method by which the access points in the system interoperate.

The components are (i) "Four corner" network architecture, (ii) RESTful API scheme, (iii) Mutual Transport Layer Security (mTLS) for authenticating access points with each other, and (iv) DNS-based lookup of trading partners and how to connect them.

FIG. 1 is an embodiment of a system for exchanging electronic data between trading partners. In this "four corner" architecture, a configuration in which trading partners communicate with each other through access points, two trading partners, Source Trading Partner ("Source TP") 110 and Destination Trading Partner ("Destination TP") 120 intend to exchange messages, for example, business documents. Each trading partner is serviced by a network access point, Source Access Point ("Source AP") 115 for the Source TP 110 and Destination Access Point ("Destination AP") 125 for the Destination TP 120. In this system, the trading partners do not communicate directly with each other. They instead send and receive all messages from their network access points. It is the access points that have the responsibility of communicating with each other on behalf of their trading partners.

While all VAN networks interconnect today using one of several possible file transfer protocols (e.g., SFTP or AS2), in the systems and methods described herein, the access points interconnect using REST APIs, shown as 140*a*, 140*b*, 140*c*, and 140*d*. REST APIs, leveraging the HTTP/S protocol, provide a much lighter weight, easier to manage connectivity option. Also, Internet value-add services are largely optimized around the HTTP/S protocol, such as network route optimization, compression, and intelligent routing, thus allowing this system to take advantage of such services to improve resiliency and efficiency.

Further, the systems and methods described herein do not prescribe a specific payload format (e.g., based on XML or JSON) and instead supports any message format (e.g., EDI X.12, EDIFACT, cXML) as its payload. Meta information about the transaction (sender identity, receiver identity, business operation, sequence number, etc.) may be encoded as HTTP Headers, allowing the message to remain intact. What message is exchanged is decided by the trading partners and is out of scope of this disclosure.

To authenticate the HTTP/S connection over which the REST API transaction occurs, mTLS-based authentication is leveraged. In mTLS, the source and destination exchange certificates authenticating themselves to the other. The certificates are actually for the identities of the trading partners on behalf of which the access points are establishing this connection. The certificates are administered by commercially-accepted Certificate Authorities, guaranteeing the authenticity of the identities. The access point administrators may work with the trading partners to secure such certificates as the access points are leveraging trading partners' identities. The access points may store certificates in a database, shown as 117 and 127.

The systems and methods described herein may include a DNS-based lookup of how to communicate with a trading partner. When an access point receives a message, for example, a business document, from Source TP 110 that is destined for Destination TP 120, that access point looks up the access information in a name server 130 for Destination TP 120 using a well-defined DNS schema. The returned information in the DNS lookup actually points to an address owned by Destination TP's AP (Destination AP) 125. As part of the implementation of this system, Destination AP 125 responds to a well-defined REST API-based query for what operations and associated REST APIs are available for transferring messages to the Destination TP 120 (through Destination AP 125).

In this way, access points are loosely coupled and dynamically discovered. Connections are short lived and leverage minimal resources. It is very simple to add access points and trading partners to the network by simply updating database records. There is no need to maintain a central directory or for each network provider to maintain their own registries.

Figure 2:
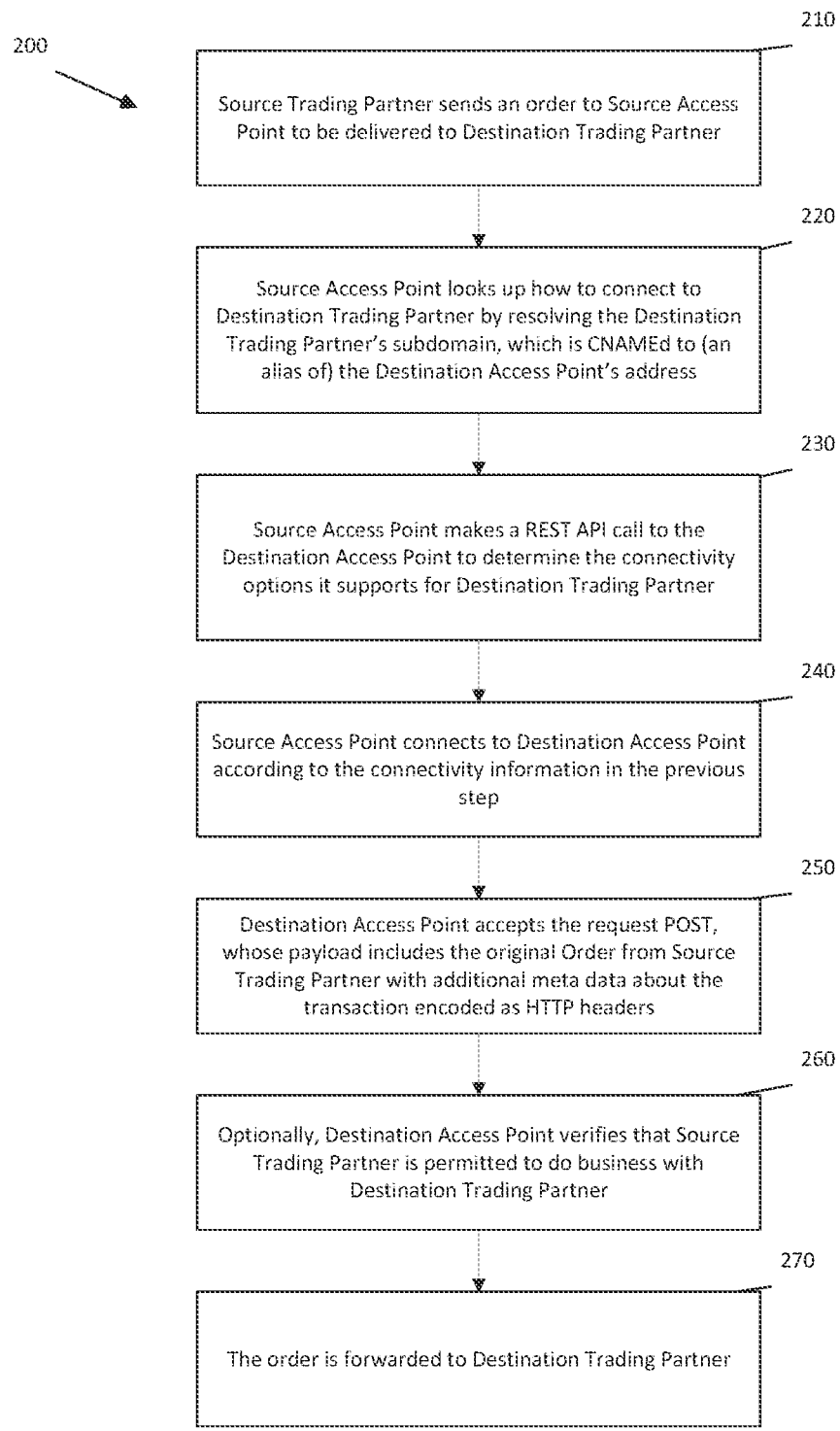
FIG. 2 is an embodiment of a method of exchanging electronic data between trading partners that can be used, for example, in the embodiment illustrated in FIG. 1.

FIG. 2 is an embodiment of a method of exchanging electronic data between trading partners 200 that can be used, for example, in the embodiment illustrated in FIG. 1. At step 210, Source TP sends a message to Source AP to be delivered to Destination TP. At step 220, Source AP looks up how to connect to Destination TP by resolving the Destination TP's subdomain, which is CNAMEd to the Destination AP's address (or to an alias of the Destination AP's address). CNAME is a Domain Name System protocol in which one domain name is aliased to another domain name such that when a message is electronically submitted to the one domain name, it is actually sent to the other domain name. In an embodiment, the Destination TP's subdomain is https://Reference-1.DestinationTP.com and is CNAMEd to https://DestinationTP.Reference-1.DestinationAP.com. In that embodiment, the Source AP looks up how to connect to Destination TP by resolving https://Reference-1.DestinationTP.com, which is CNAMEd to https://DestinationTP.Reference-1.DestinationAP.com, which indicates Destination TP's AP. It should be noted that the above is one illustrative example, and at least the address of the Destination TP's AP may vary.

At this step, optionally, Source AP may create a local copy of information regarding how to connect to Destination TP. The information should have a reasonably short expiration time that is long enough to service near-term transactions to the same Destination TP, but short enough to be responsive to changes made to the Destination TP or Destination AP's configuration. In an embodiment, Source IL may force a refresh of the information.

At step 230, Source AP makes a REST API call to the Destination AP to determine the connectivity options the Destination AP supports for the Destination TP. A connectivity option includes, but is not limited to, provided services (e.g. "invoicing"), provided operations (e.g. "SubmitInvoice"), accepted payload formats, and accepted operation modes (synchronous or asynchronous). At step 240, the Source AP connects to the Destination AP according to the connectivity information in step 230. In step 240, the Source AP and the Destination AP negotiate a secure connection using mutual certificate-based authentication. In the preferred embodiment, the certificate for the Source TP is managed by the Source AP, and the certificate for the Destination TP is managed by the Destination AP. This step verifies the authenticity of the Source TP and Destination TP to each other. In step 250, Destination AP accepts the request POST, whose payload includes the original message from the Source TP. In an embodiment, the message contains additional meta information about the transaction encoded as HTTP headers. Step 260 is optional. At step 260, Destination AP may verify that the Source TP is on an "allowlist" that Destination AP maintains on behalf of Destination TP to verify that the Source TP is permitted to do business with Destination TP. At step 270, assuming the request is authentic and that the Source TP is on Destination TP's "allowlist," if applicable, the message is forwarded to the Destination TP.

Although the systems and methods described herein utilize a four corner architecture, such a system need not have an external access point for each trading partner, as illustrated in FIG. 1. Rather, one or more trading partners can serve as their own access point. Further, an external access point may serve multiple trading partners.

The systems and methods described herein may also include additional features, which may or may not be performed by functions of the components described above. For example, the systems and methods described herein may further include business applications and integration layers. Alternatively, the functions performed by those components may be performed by either the trading partners or access points. The business applications and integration layers are discussed in more detail below.

The rest of this disclosure presents a number of illustrative embodiments of the systems and methods of exchanging electronic data between trading partners as described above.

System for Exchanging Electronic Data Between Trading Partners

Figure 3:
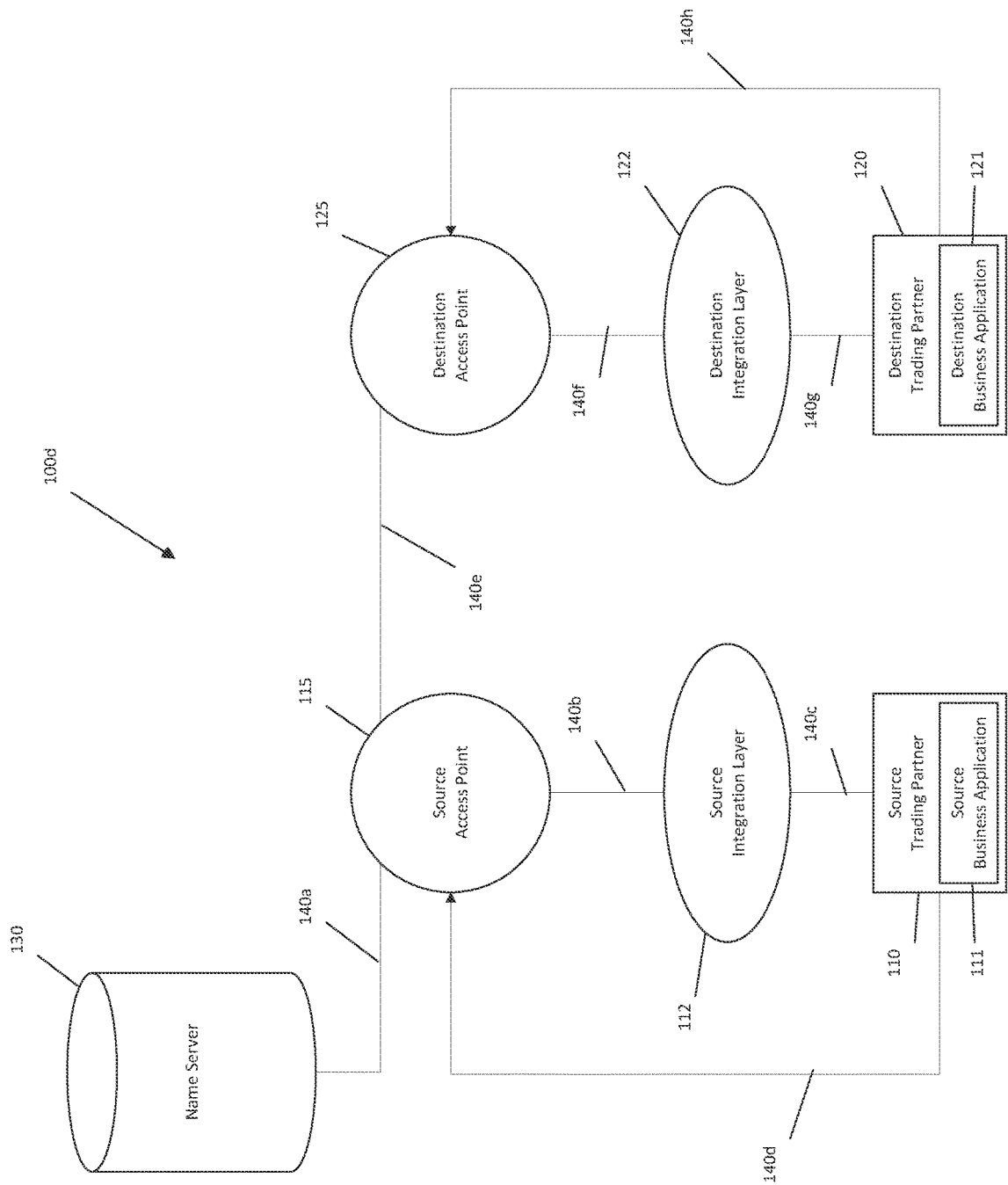
FIG. 3 is an embodiment of a system for exchanging electronic data between trading partners.

FIG. 3 is an embodiment of a system for exchanging electronic data between trading partners. In this embodiment, the modern electronic data exchange system consists of loosely coupled functional clusters, each comprising of three individual roles: an access point role, a trading partner role, and an integration layer role. In FIG. 3, a message, for example, a single business document, can be sent from Source TP 110 to the Destination TP 120.

This disclosure describes the functionality of access point role and its interface to the integration layer. The way the trading partner and integration layer roles are implemented is outside the scope of this disclosure, but this disclosure will make assumptions on how these roles typically behave.

Functional clusters consisting of an access point, one or more integration layers, and one or more trading partners are independent from each other, and they do not directly share any common directory or other mechanism to know about each other. These clusters are somewhat analogous to mail servers; anyone can set up a mail server (analogous to an access point) and users can utilize that mail server (analogous to trading partners). These clusters communicate with each other using standard Internet protocols for endpoint discovery, metadata exchange, and actual communications between different trading partners regardless of where they are located and who is providing the access point implementation for them.

Figure 4:
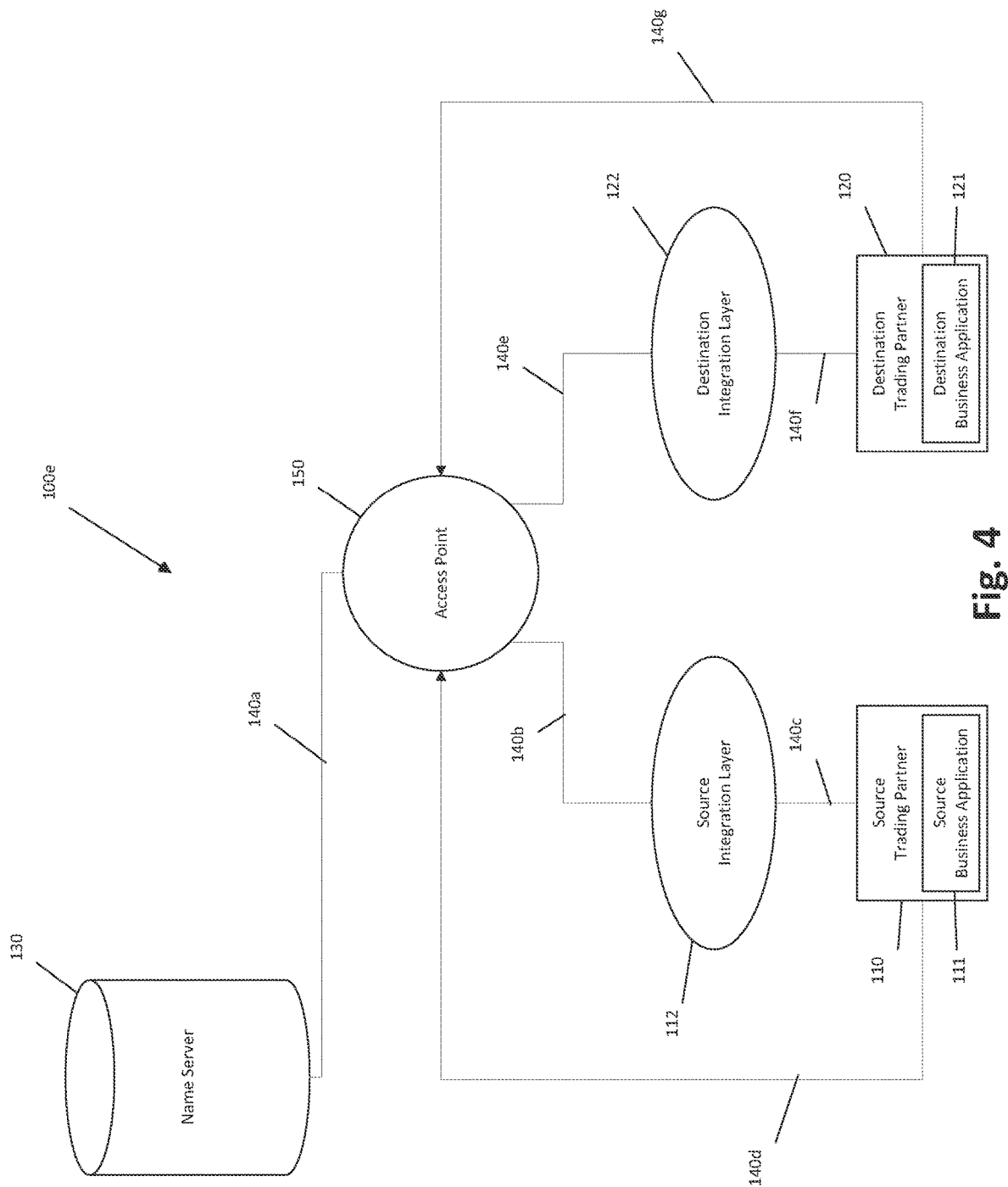
FIG. 4 is an embodiment of a system for exchanging electronic data between trading partners in which both Source TP and the Destination TP are served by the same AP.

In practice, the integration layer and access point will often be provided by a solution provider such as an EDI operator, a VAN vendor, or an integrations service provider hosting their service as-a-service model. In most of these cases, the integration layer and access point provider may be provided by a single vendor who is providing their services to one or more trading partners. The present disclosure defines the model for how the access points communicate with each other (also in the case where different trading partners are served by a single access point, as illustrated in FIG. 4) and recommends the model for how the integration layer and access point communicate with each other.

The systems and methods described herein are based on "four-corner" model, where trading partners communicate with each other through two access points, for example, as illustrated in FIG. 3. In the case where both Source TP 110 and Destination TP 120 are served by the same AP 150, an embodiment of which is illustrated in FIG. 4, the AP 150 still defines the model described in this document.

Returning to FIG. 3, in the four-corner model, the end-to-end communication consisting of a message, for example, a business document, happens between two trading partners. The trading partner that initiates the communications is called the Source TP 110, and the trading partner that will be the recipient of a message, or respond to a synchronous query from Source TP 110, is the Destination TP 120.

Similarly, the access point that is serving the Source TP 110 is called Source AP 115, and the access point that is serving the Destination TP 120 is called Destination AP 125.

FIG. 4 is an embodiment of a system for exchanging electronic data between trading partners in which both Source TP 110 and the Destination TP 120 are served by the same AP 150. In this embodiment, the AP 150 works in both Source AP and Destination AP roles. In this embodiment, this AP 150 follows the rules regarding access point to access point communications. In this embodiment, the AP 150 does not create internal optimizations for the message routing between Source AP and Destination AP roles in order for the system for exchanging electronic data between trading partners to have global, unified rules on how to handle the messaging and security features of the protocol.

System Nodes:

Returning to FIG. 3, the following is a description of the nodes that may or may not be present in the system for exchanging electronic data between trading partners. Nodes are systems that participate in information exchange within the network described herein, and can be sources of information, recipients of information, or pass (and possibly transform) messages within the network.

Trading partners (110 and 120). A trading partner is an organization willing to exchange messages automatically with other trading partners. Messages that trading partners want to exchange may carry data, for example, a business document. The messages may be exchanged between the trading partners' business applications. The messages can utilize different message formats, including different EDI formats, JSON or XML structured messages, PDF or other binary files, among others.

Business applications (111 and 121). Business applications are IT systems that manage trading partners' internal business processes. Business applications can be e.g. ERP, CRM or TMS systems or customized applications and can be hosted by a trading partner, a trading partner's service partner, or they can be cloud-based applications. Business applications do not typically communicate directly with an access point; in some embodiments, the integration layer is responsible to provide integration to business applications.

Access points (115 and 125). An access point provides the connectivity to other access points within the system for exchanging electronic data between trading partners. It may send messages to other access points in the system when requested by the integration layer or trading partner, and receive messages, and forward them to the integration layer or trading partner when other access points send messages to the connected trading partner.

The access point can be implemented by the trading partner, or in a more common scenario, provided by a third party serving multiple trading partners using its multi-tenant access point implementation (e.g. a VAN network provider). In such scenarios, the third party typically provides a combination of access point and integration layer to provide, for example, message translation and transformation services in addition to the capabilities described herein.

Integration layers (112 and 122). The integration layer is responsible for interfacing with an access point and providing message transformation capabilities, business process orchestration, etc., so that messages exchanged in the system for exchanging electronic data between trading partners are fully interoperable with the trading partners' business applications. For instance, if a Source TP 110 sends an asynchronous message containing an ANSI X.12 formatted message, and the Destination TP 120 only can process UN/EDIFACT documents, then either Source IL 112 or Destination IL 122 needs to execute required message transformations.

In addition, the integration layer can provide different types of protocol connectivity between the trading partner and access point. For instance, if the trading partner can only communicate via FTP or SFTP, then the integration layer is responsible for providing these protocol bridges.

The various embodiments described herein can include a wide range of integration layer implementations. In some embodiments, the trading partner can choose how to implement this layer. In a typical scenario, a third-party access point provider also provides required transformation and orchestration capabilities, so that the access points and integration layers can be provided by the same vendor.

Communication Between Nodes:

Domain Names. As practically any trading partner owns an Internet domain name, the systems and methods described herein use root domain names (e.g., example.com, example.org, example.edu, etc.) with top level domain names (e.g., .com, .org, .edu, etc) to identify trading partners. In the case of countries that restrict the use of the second-level domain name, such as United Kingdom, the addressing can use a combination of third, second, and top-level domain names (e.g. example.co.uk instead.) As the domain name is not necessarily tied to the actual name of the trading partner, and a trading partner can hold multiple domain names—that would be treated as separate trading partners in the systems and methods described herein—the trading partner should carefully decide which domain name to use in the systems and methods described herein to exchange electronic data to avoid possible confusion.

In some embodiments, the access points act on behalf of their respective trading partners. Consider a situation where exampleprovider.com is providing access point services for trading partner example.com. When another trading partner, a Source TP, sends a message to example.com, the Destination TP, the Source TP is not addressing an endpoint at the Destination AP's address (exampleprovider.com) but is instead addressing an endpoint at the Destination TP's address (example.com). Similarly, the actual message sender (Source AP) is not identified as the Source AP, but as the Source TP. Further, while endpoint addresses, including the domain name, can be overridden by the service metadata (as explained later), the standard endpoint address remains in example.com domain. In addition, at least the metadata discovery endpoint is located in the trading partner's domain to allow metadata search.

For the access point to act on behalf of the trading partner, the trading partner sets up subdomain alias to the access point's server or services using the DNS protocol CNAME approach, known in the art. The subdomain name will act as a root address for the endpoints for this trading partner. The subdomain name conforms to naming rules, an example of which is described below, to ensure that service discovery and messaging will act correctly.

In an embodiment, the subdomain address to be used has the form of reference-n.example.com, where n is a positive integer, and endpoints for the TP domain example.com have a form of https://reference-n.example.com/endpointname. "Reference" may be any alphanumeric string and is the same for each subdomain address in the system.

Consider an example. Returning to FIG. 1, assume Source TP 110 has domain example-tp1.com. It has a subdomain reference-1.example-tp1.com. The subdomain reference-1.example-tp1.com is CNAMEd to the Source AP. Similarly, with respect to the Destination TP 120, the Destination TP 120 has domain example-tp2.com and subdomain reference-1.example-tp2.com. The subdomain reference-1.example-tp2.com is CNAMEd to the Destination AP 125. The Source AP 115 is configured to make an HTTPS call using mTLS to the Destination AP 125. The Source AP 115 can act on behalf of the Source TP 110, including using the client certificate of example-tp1.com for authentication purposes. The Destination AP 125 can act on behalf of the Destination TP 120, including using the server certificate of example-tp2.com for authentication purposes.

The variable n is in the domain name because of the possibility that a trading partner may have multiple access point providers configured to operate in the system, each hosting their own aliased subdomain. For instance, one access point provider may be specialized in providing services for purchase process messaging and another for invoicing process. In such a case, the first access point provider may be hosting a domain that reference-1.example.com is CNAMEd to, and another access point provider may be hosting a domain that subdomain reference-2.example.com is CNAMEd to.

In an embodiment, if multiple subdomains are used for a single trading partner, the address numbering is continuous with n starting from 1 and having an increment of 1 for subsequent subdomain names. In practice, it will likely be the case that a trading partner will have one and only one access point provider, and thus will host a single reference-1.example.com domain which is CNAMEd to its access point's endpoint domain.

In the unlikely case that a trading partner has already registered these addresses for other purposes, the naming of reference-n servers, as defined in this specification, should have n starting immediately after the names of reference-n servers reserved for other purposes. In the even more unlikely case where the number of existing servers is dynamic, the Source AP and Destination AP need to agree how the Destination AP delivers metadata to Source AP by other means. In these cases, the URL property of the operation object in a header is set to match the Destination AP's alternative endpoint address.

The systems and methods described herein use HTTPS messaging between access points. To provide a proof of identity for both Source TP and Destination TP, all HTTPS communications use mutual TLS to prove the identity of both Source TP and Destination TP during the communications. That is, the communications require both the server-side TLS certificate and also a client-side certificate.

In an embodiment, the Destination TP certificate is a valid certificate and protects the called endpoint. Further, the Source TP certificate protects the Source TP's Domain Name.

Domain Addressing. The systems and methods described herein use a three-part addressing scheme to identify operations that Source TP can call. A full address is a triplet {Domain Name, Service Name, Operation Name}. "Domain Name" is the domain name of the trading partner, as explained above.

"Service Name" is a logical grouping of operations. Trading partners can have any number of services, and their management may be distributed to multiple access points. Examples of service names include Invoicing and Order-Management. Service names under given Domain Name are unique.

"Operation Name" identifies a single operation that performs a specific task, such as receiving a document or answering a service query. Examples of operation names include SendInvoice, ReceiveOrder, and AnswerQuery. There can be any number of operations within a single service. Operation names under given Service name are unique.

In one embodiment, service and operation names can be alphanumeric, case-sensitive strings (A-Z, a-z, 0-9). In some embodiments, names may not contain whitespaces or other special characters.

In the event in which the destination trading partner's electronic data interchange (EDI) address is known but its subdomain is not known, the systems and methods described herein may further include mapping the EDI address to the domain addressing scheme.

Payload agnosticism. The systems and methods described herein are designed to be payload agnostic; they do not force any restrictions to the message format as long as it can be rendered into an HTTP message. A message may contain a message and headers. The systems and methods can be used to exchange text documents, EDI documents, CSV files, XML, or JSON documents, PDF files or other binary data, etc.

The message payload may be transferred in the HTTP request body. A standard HTTP header may be used to indicate the payload type. In addition to this, optional headers can be used to transfer message attributes that are not a part of the message payload.

Even though the system described herein provides end-to-end security with authentication, authorization and encryption, trading partners and their access point providers may select to use additional security mechanisms in addition to those described herein. For instance, it is possible to exchange AS2 documents over a system message exchange. As the present disclosure does not address the usage of AS2 certificates or other AS2 protocol parameters (or handling any other specific message format), the implementation of handling these parameters is left to the trading partners, access points, and associated integration layers to specify in detail.

Synchronous and asynchronous messaging. The systems and methods described herein are designed for both synchronous and asynchronous messaging, controlled by a header by the sender of the message.

Figure 5:
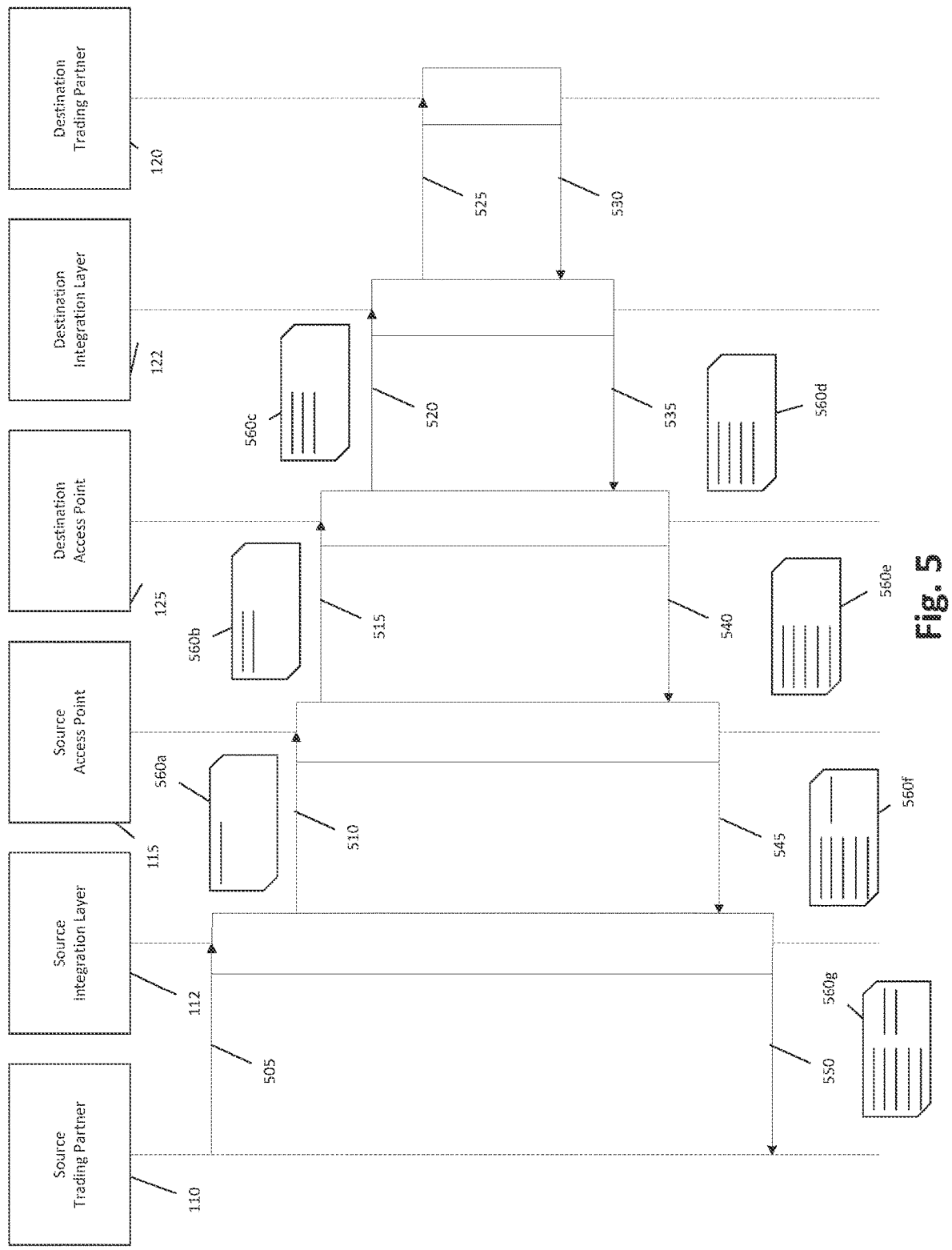
FIG. 5 is an illustration showing how the systems and methods described herein message synchronously.

FIG. 5 is an illustration showing how the systems and methods described herein message synchronously. In the synchronous scenario, Source TP 110 can receive immediate feedback and information from the Destination TP 120, satisfying cases where Destination TP's 120 business applications provide API-based interfaces. In an embodiment, Reference-Delivery-Method=sync is used to define that the message will be synchronous.

At 505, Source TP 110 sends a message to the Source Integration Layer ("Source IL") 112. Alternatively, the Source IL may fetch the information from Source TP without the Source TP actively sending it to the Source IL. At 510, the Source IL sends the message to the Source AP 115. In one embodiment, the message is sent using HTTP POST. At 515, the Source AP 115 sends the message to the Destination AP 125. In one embodiment, the message is sent using HTTP POST. In 520, the Destination AP 125 sends the message to the Destination Integration Layer ("Destination IL") 122. In one embodiment, the message is sent using HTTP POST. At 525, the Destination IL 122 sends the message to the Destination TP 120. At 530, a response is transmitted to the Destination IL 122, and then from the Destination IL 122 to the Destination AP 125 at 535, and then from the Destination AP 125 to the Source AP 115 at 540. In one embodiment, the response is sent from the Destination AP 125 to the Source AP 115 as HTTP POST response. At 545, the response is sent from the Source AP 115 to the Source IL 112, and then from the Source IL 112 to the Source TP 110 at 550.

Figure 6:
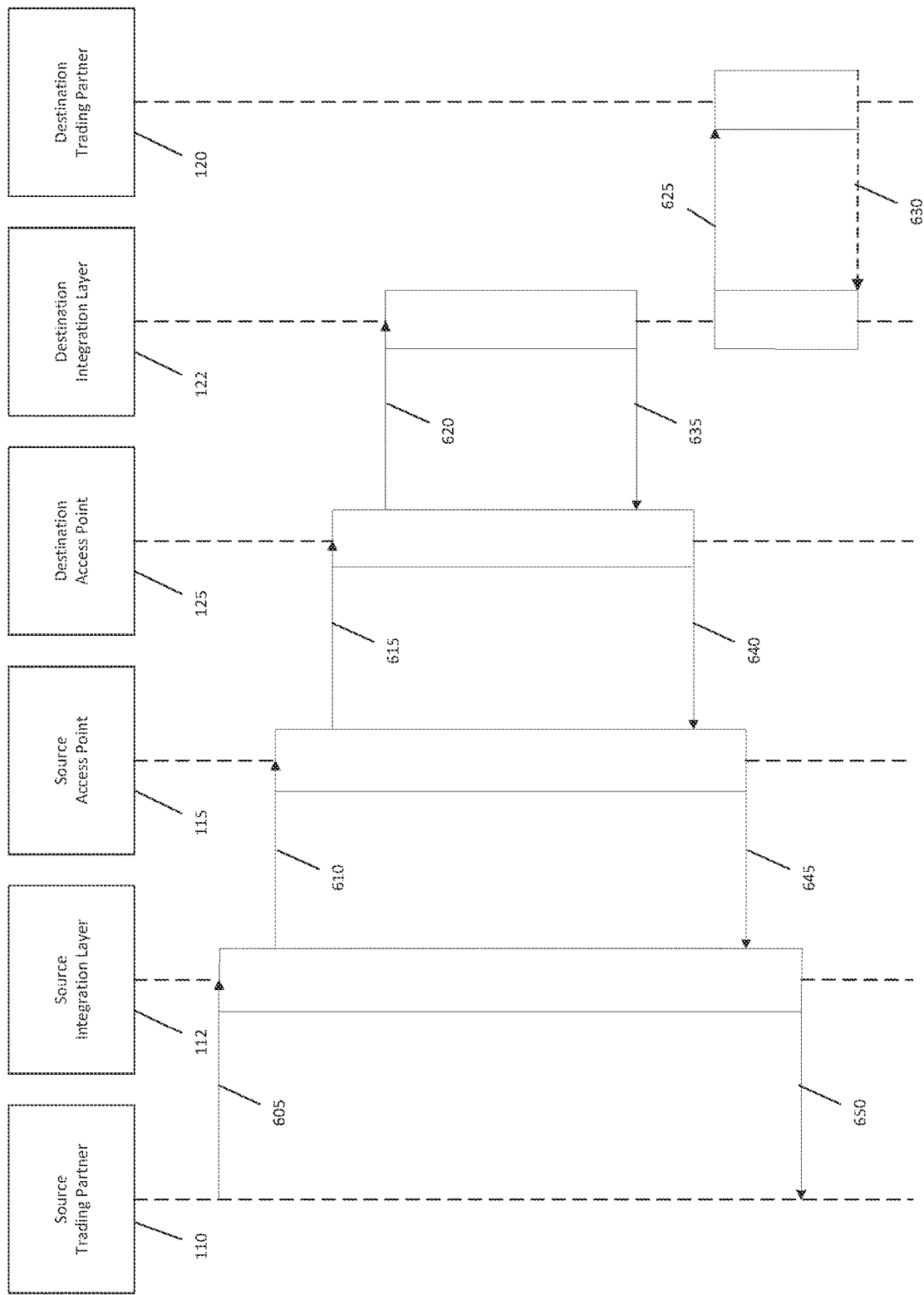
FIG. 6 is an illustration showing how the systems and methods described herein message asynchronously.

FIG. 6 is an illustration showing how the systems and methods described herein message asynchronously. The asynchronous messaging scenario is well-fitted for EDI-type document exchange scenarios, where Destination TP is receiving a document and processing it in the back-end, possibly later, and is not able to provide immediate feedback. For asynchronous scenarios, the systems and methods described herein provide the possibility to send optional instructions on how the asynchronous feedback can be delivered back to the Source TP. In an embodiment, the reference delivery method may be set to asynchronous to define that the message will be asynchronous.

At 605, Source TP 110 sends a message to Source IL 112. Alternatively, the Source IL may fetch the information from Source TP without the Source TP actively sending it to the Source IL. At 610, the Source IL 112 sends the message to the Source AP 115. In an embodiment, the message is sent using HTTP POST. At 615, the Source AP 115 sends the message to the Destination AP 125. In one embodiment, the message is sent using HTTP POST. At 620, the Destination AP 125 sends the message to the Destination IL 122. In an embodiment, the message is sent using HTTP POST. At 625, the Destination IL 122 sends the message to the Destination TP 120.

The Destination TP 120 receives the message and processes it. Sometime later, the Destination TP 120 will provide a response to the Destination IL 122, at 630. At 635, the Destination IL 122 sends the response to the Destination AP 125 at 635, and then from the Destination AP 125 to the Source AP 115 at 640. In one embodiment, the response is sent from the Destination AP 125 to the Source AP 115 as HTTP POST response. At 645, the response is sent from the Source AP 115 to the Source IL 112, and then from the Source IL 112 to the Source TP 110 at 650.

Figure 7:
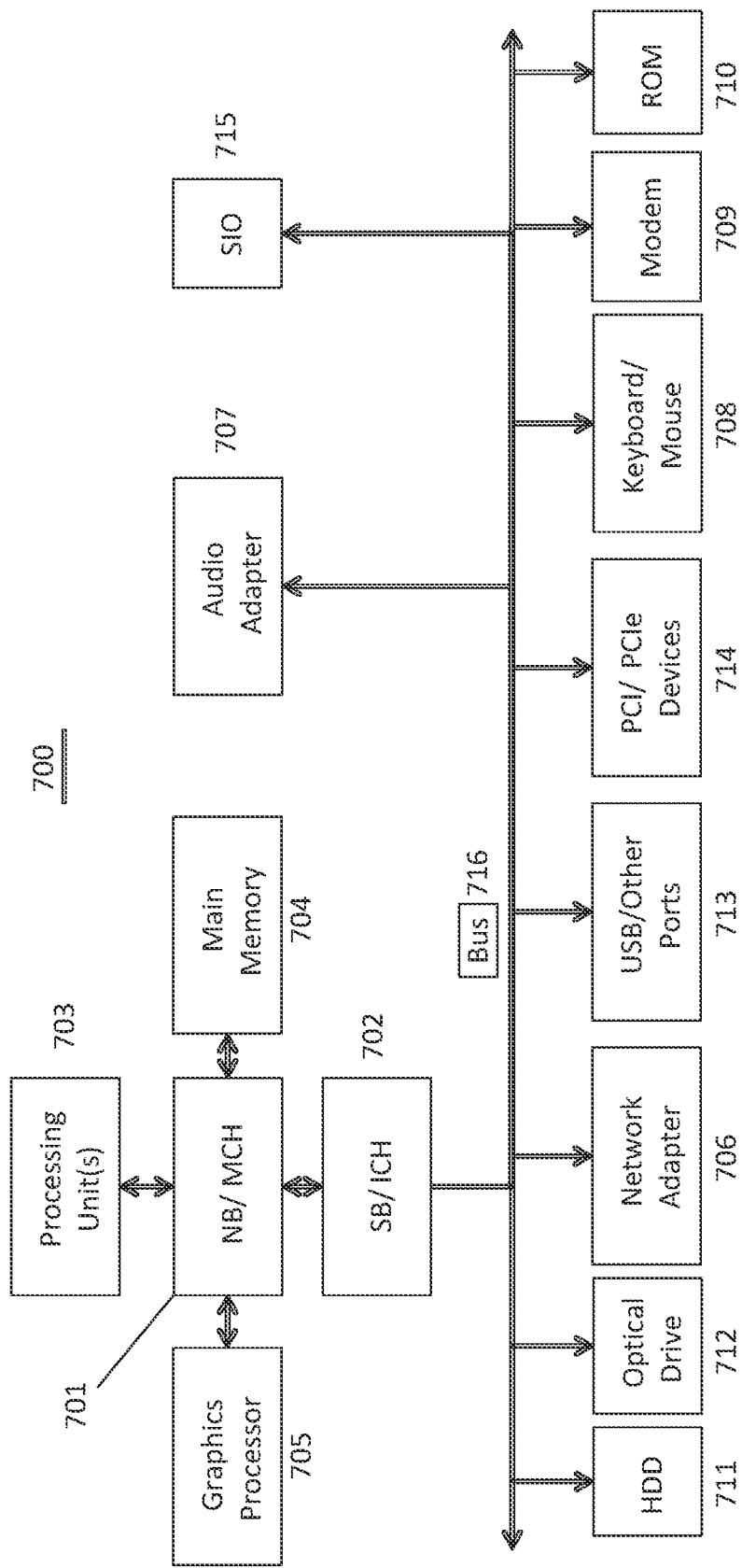
FIG. 7 is a block diagram of an example data processing system in which aspects of the illustrative embodiments may be implemented.

FIG. 7 is a block diagram of an example data processing system 700 in which aspects of the illustrative embodiments may be implemented. Data processing system 700 is an example of a computer in which computer usable code or instructions implementing the process for illustrative embodiments of the present invention are located.

In the depicted example, data processing system 700 can employ a hub architecture including a north bridge and memory controller hub (NB/MCH) 701 and south bridge and input/output (I/O) controller hub (SB/ICH) 702. Processing unit 703, main memory 704, and graphics processor 705 can be connected to the NB/MCH 701. Graphics processor 705 can be connected to the NB/MCH 701 through an accelerated graphics port (AGP).

In the depicted example, the network adapter 706 connects to the SB/ICH 702. The audio adapter 707, keyboard and mouse adapter 708, modem 709, read only memory (ROM) 710, hard disk drive (HDD) 711, optical drive (CD or DVD) 712, universal serial bus (USB) ports and other communication ports 713, and the PCI/PCIe devices 714 can connect to the SB/ICH 702 through bus system 716. PCI/PCIe devices 714 may include Ethernet adapters, add-in cards, and PC cards for notebook computers. ROM 710 may be, for example, a flash basic input/output system (BIOS). The HDD 711 and optical drive 712 can use an integrated drive electronics (IDE) or serial advanced technology attachment (SATA) interface. The super I/O (SIO) device 715 can be connected to the SB/ICH 702.

An operating system can run on processing unit 703. The operating system can coordinate and provide control of various components within the data processing system 700. As a client, the operating system can be a commercially available operating system. An object-oriented programming system, such as the Java programming system, may run in conjunction with the operating system and provide calls to the operating system from the object-oriented programs or applications executing on the data processing system 700. As a server, the data processing system 700 can be an IBM® eServer™ System p® running the Advanced Interactive Executive operating system or the Linux operating system. The data processing system 700 can be a symmetric multiprocessor (SMP) system that can include a plurality of processors in the processing unit 703. Alternatively, a single processor system may be employed.

Instructions for the operating system, the object-oriented programming system, and applications or programs are located on storage devices, such as the HDD 711, and are loaded into the main memory 704 for execution by the processing unit 703. The processes for embodiments of the website navigation system can be performed by the processing unit 703 using computer usable program code, which can be located in a memory such as, for example, main memory 704, ROM 710, or in one or more peripheral devices.

A bus system 716 can be comprised of one or more busses. The bus system 716 can be implemented using any type of communication fabric or architecture that can provide for a transfer of data between different components or devices attached to the fabric or architecture. A communication unit such as the modem 709 or network adapter 706 can include one or more devices that can be used to transmit and receive data.

Those of ordinary skill in the art will appreciate that the hardware depicted in FIG. 7 may vary depending on the implementation. For example, the data processing system 700 includes several components which would not be directly included in some embodiments of the system for generating digital shopping carts, marketplace device, user device, or retailer digital shopping cart generation device.

Moreover, other internal hardware or peripheral devices, such as flash memory, equivalent non-volatile memory, or optical disk drives may be used in addition to or in place of the hardware depicted. Moreover, the data processing system 700 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

Method of Exchanging Electronic Data Between Trading Partners

Figure 8:
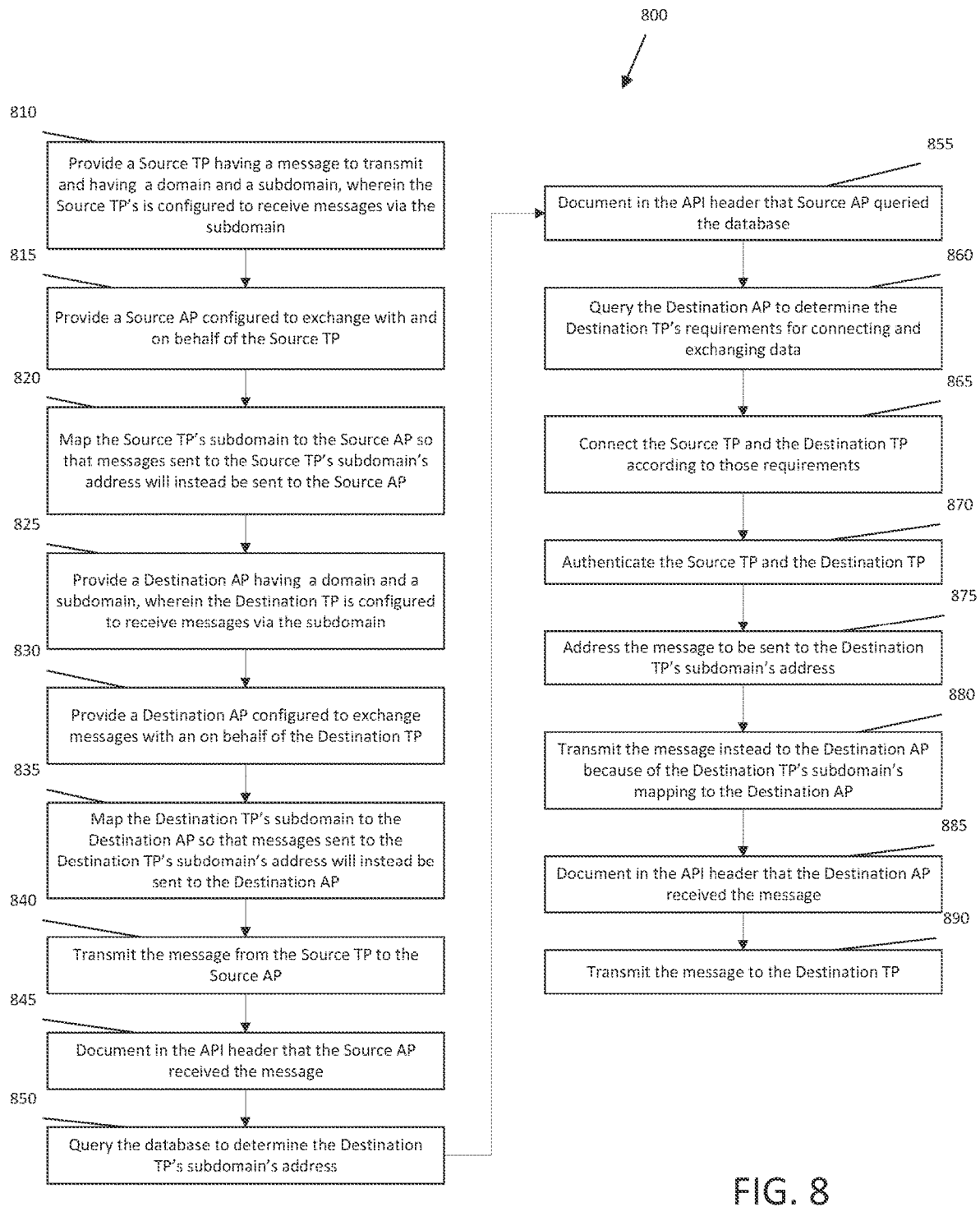
FIG. 8 is an embodiment of a method of exchanging transaction log data between trading partners.

FIG. 8 is an embodiment of a method of exchanging transaction log data between trading partners. This embodiment includes a setup phase and a message exchange phase. The setup phase may only be executed once, and the message exchange phase may be executed on a per message basis. In this embodiment, the setup phase includes steps 810-835, and the message exchange phase includes steps 840-890.

At step 810, a Source TP having a message to transmit and having a domain and a subdomain is provided. The Source TP is configured to receive message via its subdomain. At step 815, a Source AP configured to exchange with and on behalf of the Source TP is provided. At step 820, the Source TP's subdomain is mapped to the Source AP so that messages sent to the Source TP's subdomain's address will instead be sent to the Source AP. At step 825, a Destination AP having a domain and a subdomain is provided. The Destination TP is configured to receive messages via its subdomain. At step 830, a Destination AP configured to exchange messages with an on behalf of the Destination TP is provided. At step 835, the Destination TP's subdomain is mapped to the Destination AP so that messages sent to the Destination TP's subdomain's address will instead be sent to the Destination AP. At step 840, the message is transmitted from the Source TP to the Source AP. At step 845, it is documented in the API header that the Source AP received the message. At step 850, the name server (for example, DNS) is queried to determine the Destination TP's subdomain's address. At step 855, it is documented in the API header that the Source AP queried the database. At step 860, the destination AP is queried to determine the Destination TP's requirements for connecting and exchanging messages. At step 865, the Source TP and the Destination TP connect according to those requirements. At step 870, the Source TP and the Destination TP are authenticated. At step 875, the message is addressed to be sent to the Destination TP's subdomain's address. At step 880, the message is instead transmitted to the Destination AP because of the Destination TP's subdomain's mapping to the Destination AP. At step 885, it is documented in the API header that the Destination AP received the message. At step 890, the message is transmitted to the Destination TP.

Adoption Path

There are disadvantages to considering the systems and methods described herein as a separate and new VAN network construct. It is a highly complex and very difficult exercise to build a new network, especially in light of existing, more well established networks that largely define the center of gravity (VAN networks).

Instead, one may consider the systems and methods described herein to be an evolution of the VAN architecture, enhancing it with new capabilities, thereby extending already established networks and increasing their value. Over time, older VAN network interconnects may atrophy, leaving the systems and methods described herein in place and then well established.

The systems and methods described herein may be positioned as another protocol to a VAN, not as another VAN itself. When a message is received and processed in a VAN it is handed off to a co-resident process compliant with the system and methods described herein that takes care of delivering that payload to a connected company or to another access point configured to operate with the systems and methods described herein. Mechanically, this handoff could happen in a variety of ways, such as by way of a special "mailbox" that is monitored by a separate processor that is compliant with the systems and methods described herein, or via a message bus. This has the added benefit of creating a loosely-coupled relationship between established VANs and the systems and methods described herein, which over time could evolve into a more organic integration.

So to consider how the systems and methods described herein might be adopted, it makes sense to break them down into three evolutionary steps. A VAN provider could elect to start and end at any step.

Figure 9:
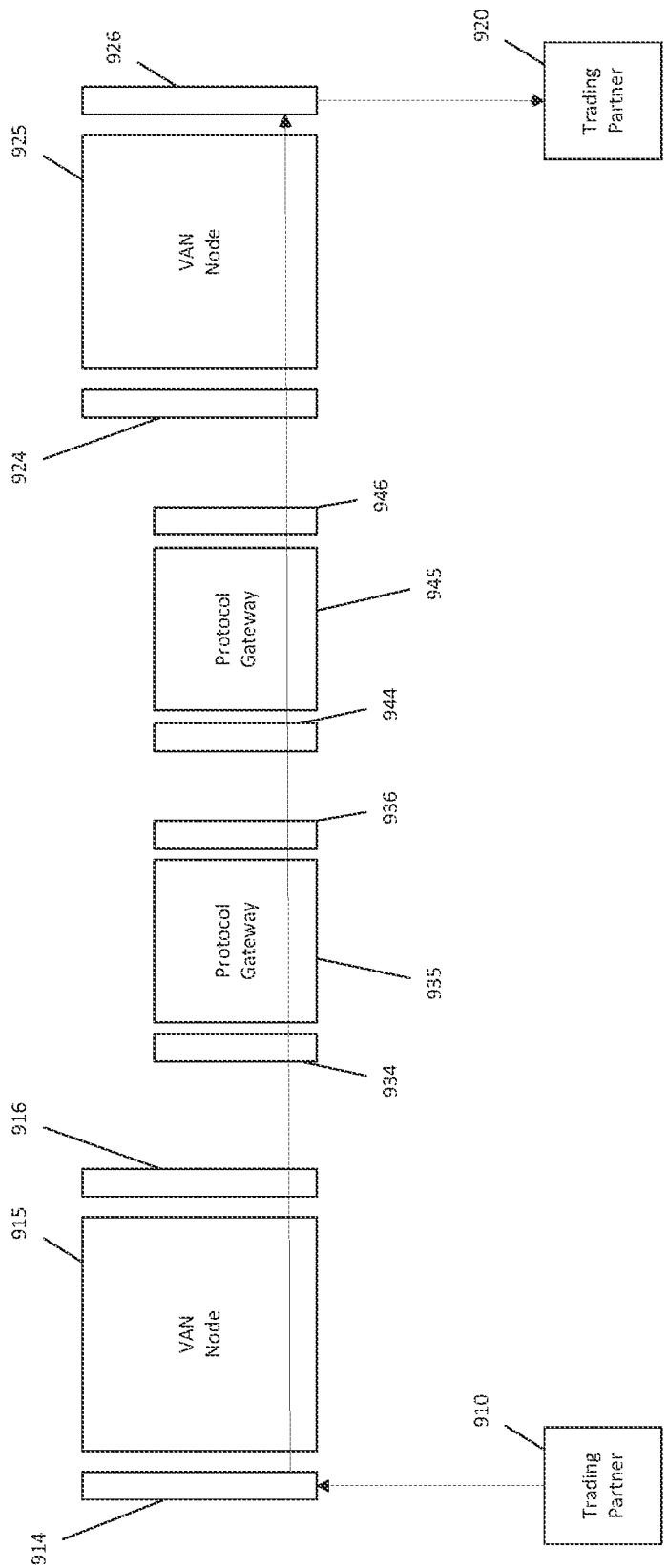
FIG. 9 is an illustration of an embodiment of how VAN nodes could use one of their standard protocols to integrate and interact with an independent protocol gateway compliant with the systems and methods described herein.

Protocol Gateway:

FIG. 9 is an illustration of an embodiment of how VAN nodes could use one of their standard protocols to integrate and interact with an independent protocol gateway compliant with the systems and methods described herein. In this embodiment, the trading partners are shown as 910 and 920. The VAN nodes are shown as 915 and 925. The VAN nodes' protocols are shown as 914, 916, 924, and 926. The compliant gateways are shown as 935 and 945. The compliant gateway protocols that are compliant with the systems and methods described herein are shown as 936 and 944. A compliant gateway, 935, for example, could use one of the more popular protocol standards (e.g. JMX messaging, SFTP, HTTP, AS2) to interact with an existing VAN node at 934 and 946. It could then perform address translation and lookup to find to which other access points are configured to be compliant with the systems and methods described herein to forward the message. That other access point, 925, for example, could also implement a gateway compliant with the systems and methods described herein, 945, for example, or more natively. To the sender, it doesn't matter as long as the receiver can be discovered as a node that is compliant with the systems and methods described herein.

This is the least intrusive mechanism for adoption since it is least disruptive to the existing VAN implementation and architecture. Plus, it makes room for a generalized open source gateway reference implementation. A VAN provider could elect to remain with an API gateway approach. However, over time, as adoption of the systems and methods increases across all VAN providers and more traffic starts to shift from traditional file transfer protocols to the systems and methods described herein, the provider may elect to start simplifying the solution and lower the costs of additional infrastructure by transitioning to Native Protocol Support.

Native Protocol Support

Figure 10:
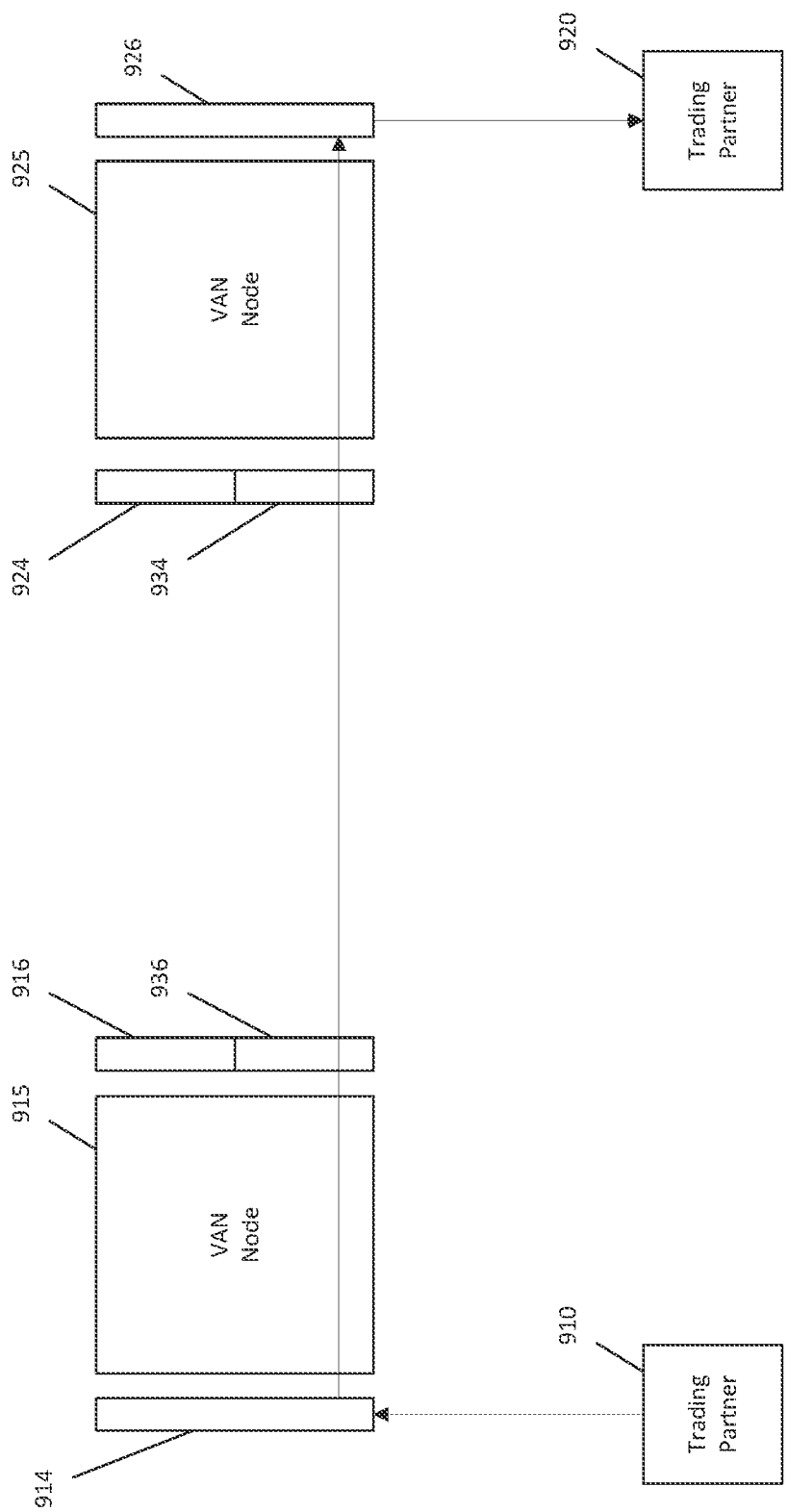
FIG. 10 illustrates an embodiment in which the VAN solution has implemented the systems and methods described herein natively as a protocol, eliminating the need for a stand-alone gateway compliant with the systems and methods described herein.

FIG. 10 illustrates an embodiment in which the VAN solution has implemented the systems and methods described herein natively as a protocol, eliminating the need for a stand-alone gateway compliant with the systems and methods described herein. In this embodiment, the trading partners are shown as 910 and 920. The VAN nodes are shown as 915 and 925. The VAN nodes' protocols are shown as 914, 916, 924, and 926. The protocols that are compliant with the systems and methods described herein are shown as 936 and 934.

Every VAN implementation has its own protocol implementation approach, so it becomes more difficult to implement an open source reference implementation for a VAN protocol, but not impossible to provide a decent starting point.

As trading partners pursue more real-time transactions themselves based on APIs, and begin to need synchronous end-to-end API-based transactions, VAN providers will need to transition to Synchronous Transaction Support to support such use cases.

Synchronous Transaction Support

Figure 11:
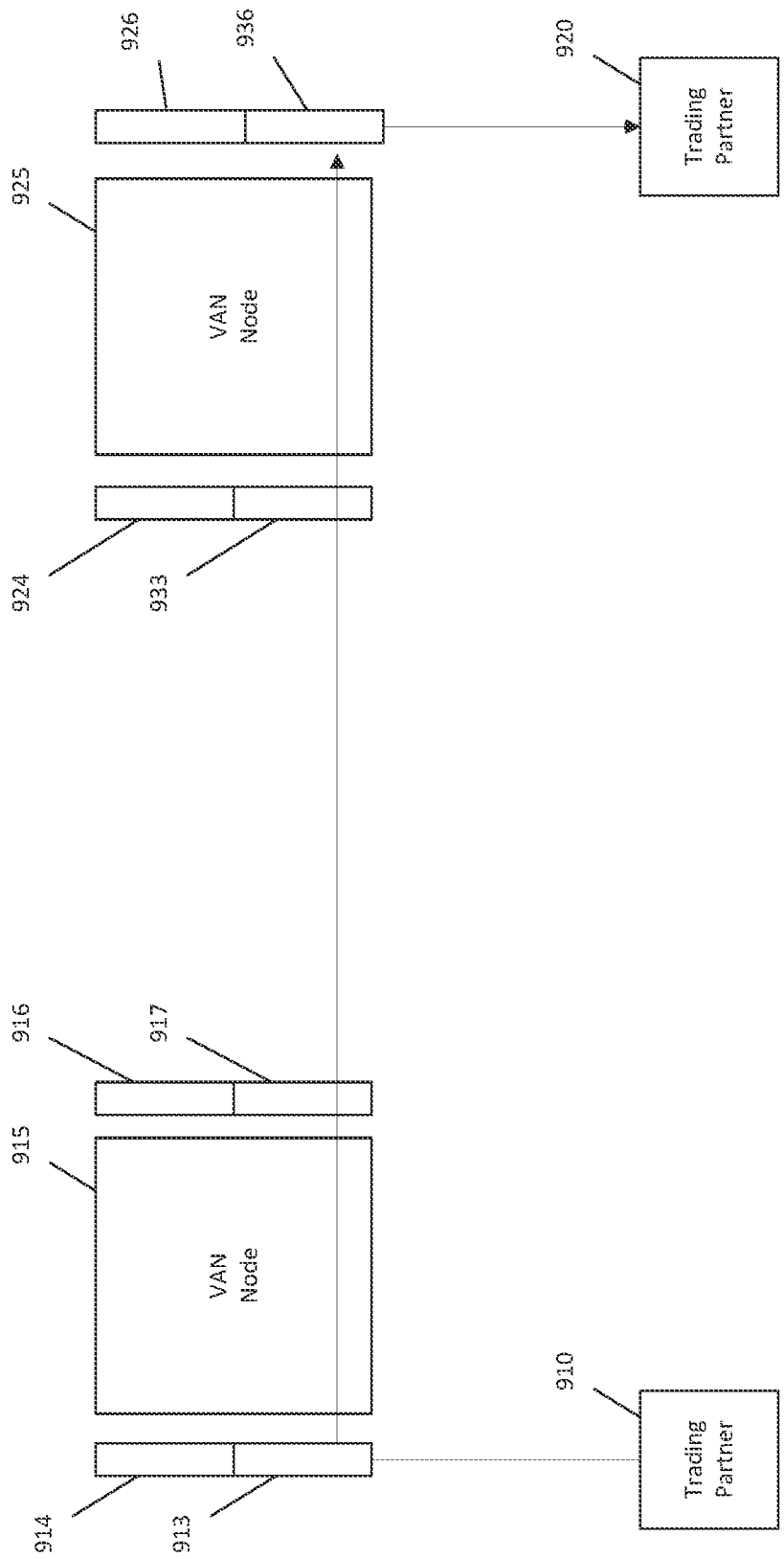
FIG. 11 illustrates an embodiment of how, as the native implementation of the systems and methods described herein mature on the VAN node, it can open up to support end-to-end synchronous transactions, taking the legacy transformation and routing function out of the way.

FIG. 11 illustrates an embodiment of how, as the native implementation of the systems and methods described herein mature on the VAN node, it can open up to support end-to-end synchronous transactions, taking the legacy transformation and routing function out of the way. In this embodiment, the trading partners are shown as 910 and 920. The VAN nodes are shown as 915 and 925. The VAN nodes' protocols are shown as 914, 916, 924, and 926. The protocols that are compliant with the systems and methods described herein are shown as 917 and 933. The trading partner facing REST APIs are shown as 913 and 936.

In this mode, the trading partners may also support a synchronous (request with response) protocol, such as an HTTP-based RESTful interface. If the target VAN node also supports synchronous transactions consistent with the systems and methods described herein, and its trading partner also supports a synchronous protocol, then the transaction could be truly end-to-end synchronous. This means that all intermediate HTTP connections may be held open (no response given) until the Destination TP returns a response on the last HTTP connection. That response is then propagated back as the response to each intermediate HTTP connection until finally given as the response, synchronously, to the Source TP.

Note that it is possible for trading partners to implement the systems and methods described herein natively, and thus broadcast their own endpoint compliant with the systems and methods described herein without the need for an intermediate access point. The access point's main function is a trusted access path for messages, providing an extra layer of security in the process, and to optionally provide data manipulation and translation services. The trading partner could take on this responsibility.

If either the receiver node (access point) or its trading partner do not support end-to-end synchronous transactions as described herein, then the transaction terminates at that point and an asynchronous transaction mode is used.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

In addition, even if a specific number is explicitly recited, those skilled in the art will recognize that such recitation should be interpreted to mean at least the recited number (for example, the bare recitation of "two trading partners," without other modifiers, means at least two trading partners, or two or more trading partners). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The functions and process steps herein may be performed automatically or wholly or partially in response to user command. An activity (including a step) performed automatically is performed in response to one or more executable instructions or device operation without user direct initiation of the activity.

We claim:

1. A computer program product in a data processing system comprising a processor and a memory comprising instructions that are executable by the processor to cause the processor to execute a method for exchanging electronic data in a system, the method comprising:
receiving, using a first application programming interface ("API"), a request to transmit data from a source trading partner to a destination trading partner;
querying a name server, using a domain name system protocol, wherein the name server comprises a subdomain of the destination trading partner to send the data to, wherein the subdomain is mapped to a destination access point, wherein a name of the subdomain conforms to a first common format, and wherein an address of the subdomain conforms to a second common format;
determining the address of the subdomain based on the querying of the name server;
addressing the data, using a second API, to be sent to the address of the subdomain; and
transmitting the data, using the second API, to the destination access point by virtue of the subdomain's mapping to the destination access point,
wherein the first API and the second API are representational state transfer (REST) APIs using hypertext transfer protocol (HTTP).

2. The computer program product of claim 1, wherein the method further comprises:
utilizing HTTP headers to include metadata related to transmission of the data.

3. The computer program product of claim 1, wherein the method further comprises:
mutually authenticating the source trading partner and destination trading partner using client and server certificates.

4. The computer program product of claim 1, wherein the destination trading partner comprises an electronic data interchange (EDI) address, the method further comprising:
mapping the EDI address to the second common format.

5. The computer program product of claim 1, wherein the method further comprises:
storing the address of the subdomain in a local database; and
refreshing the address of the subdomain in the local database after an expiration period.

6. The computer program product of claim 1, wherein the method further comprises:
querying, using a third API, the destination access point;
determining, based on the query of the destination access point, one or more connectivity options the destination access point supports for the destination trading partner; and
connecting to the destination access point according to the one or more connectivity options.

7. The computer program product of claim 1,
wherein the first common format is "https://REFERENCE-n.DOMAIN_NAME",
wherein "REFERENCE" is an alphanumeric string that is common for all subdomain names in the system,
wherein "n" is a positive integer, and
wherein "DOMAIN_NAME" is an alphanumeric string associated with the destination trading partner and is different for each trading partner in the system.

8. The computer program product of claim 1, wherein the address of the subdomain is qualified by services supported by the destination trading partner and operations supported by the destination trading partner.

9. A system for exchanging electronic data comprising:
a processor; and
a memory comprising instructions that are executable by the processor to cause the processor to execute a method for exchanging electronic data in a system, the method comprising:
receiving, using a first application programming interface ("API"), a request to transmit data from a source trading partner to a destination trading partner,
querying a name server, using a domain name system protocol, wherein the name server comprises a subdomain of the destination trading partner to send the data to, wherein the subdomain is mapped to a destination access point, wherein a name of the subdomain conforms to a first common format, and wherein an address of the subdomain conforms to a second common format,
determining the address of the subdomain based on the querying of the name server,
addressing the data, using a second API, to be sent to the address of the subdomain, and
transmitting the data, using the second API, to the destination access point by virtue of the subdomain's mapping to the destination access point,
wherein the first API and the second API are representational state transfer (REST) APIs using hypertext transfer protocol (HTTP).

10. The system of claim 9, wherein the method further comprises:
utilizing HTTP headers to include metadata related to transmission of the data.

11. The system of claim 9, wherein the method further comprises:
mutually authenticating the source trading partner and destination trading partner using client and server certificates.

12. The system of claim 9, wherein the destination trading partner comprises an electronic data interchange (EDI) address, the method further comprising: mapping the EDI address to the second common format.

13. The system of claim 9, wherein the method further comprises:
storing the address of the subdomain in a local database; and
refreshing the address of the subdomain in the local database after an expiration period.

14. The system of claim 9, wherein the method further comprises:
querying, using a third API, the destination access point;
determining, based on the query of the destination access point, one or more connectivity options the destination access point supports for the destination trading partner; and connecting to the destination access point according to the one or more connectivity options.

15. The system of claim 9,
wherein the first common format is "https://REFERENCE-n.DOMAIN_NAME",
wherein "REFERENCE" is an alphanumeric string that is common for all subdomain names in the system,
wherein "n" is a positive integer, and
wherein "DOMAIN_NAME" is a domain name associated with the destination trading partner and is different for each trading partner in the system.

16. The system of claim 9, wherein the address of the subdomain is qualified by services supported by the destination trading partner and operations supported by the destination trading partner.

\* \* \* \* \*